United States Patent
Takatsuka et al.

[11] Patent Number: 5,889,376
[45] Date of Patent: *Mar. 30, 1999

[54] MOTOR DRIVING APPARATUS

[75] Inventors: Yuji Takatsuka, Kobe; Shigeki Ohtagaki, Tokyo, both of Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 739,050

[22] Filed: Oct. 28, 1996

[30] Foreign Application Priority Data

Apr. 11, 1996 [JP] Japan ..................................... 8-089675

[51] Int. Cl.$^6$ .................................................. H02K 17/32
[52] U.S. Cl. ........................... 318/434; 318/432; 180/446; 701/41
[58] Field of Search .................................... 318/432–434, 318/280–300, 466–478, 445–465; 180/443–446; 701/41

[56] References Cited

U.S. PATENT DOCUMENTS

| | | | |
|---|---|---|---|
| 4,819,157 | 4/1989 | Hirose et al. | 363/56 |
| 4,961,033 | 10/1990 | Hirota | 318/560 |
| 5,369,349 | 11/1994 | Tsuchiya et al. | 318/811 |
| 5,404,960 | 4/1995 | Wada et al. | 180/79.1 |
| 5,457,364 | 10/1995 | Biotti et al. | 318/811 |
| 5,485,067 | 1/1996 | Nishimoto et al. | 318/432 |
| 5,552,684 | 9/1996 | Wada et al. | 318/432 |
| 5,642,247 | 6/1997 | Giordano | 318/434 |

FOREIGN PATENT DOCUMENTS

| | | |
|---|---|---|
| 0340044 | 11/1989 | European Pat. Off. . |
| 63-11480 | 1/1988 | Japan . |
| 2-158455 | 6/1990 | Japan . |
| 3-99979 | 4/1991 | Japan . |

*Primary Examiner*—David Martin
*Attorney, Agent, or Firm*—Sughrue, Mion, Zinn Macpeak & Seas, PLLC

[57] ABSTRACT

A motor driving apparatus which makes it possible to continue a suppressed power supply to an electric motor even when a detected value (Id) of a current flowing to an H-bridge circuit indicates abnormality, to thereby prevent occurrence of shock in a system in which the motor is employed as a drive source. The apparatus includes a current detecting device (12) for detecting an electric current (I) flowing to an H-bridge circuit (1), and a control device (20) which includes an abnormality decision device (24) for determining abnormality of the detected current value (Id) outputted from the current detecting device (12). When the detected current value (Id) indicates abnormality, both of the ones (Q1; Q4) of the transistors (Q1; Q2 and Q3; Q4) inserted at the side of the power supply source (3) and the ground (GND), respectively, are driven under the PWM control.

10 Claims, 4 Drawing Sheets

MOTOR DRIVING APPARATUS

BACKGROUND OF THE INVENTION

1. Field of the Invention

The present invention generally relates to a motor driving apparatus including an H-bridge circuit constituted by a plurality of transistors some of which are driven under the control of a pulse-width modulated signal of which duty ratio is controllable (hereinafter, such driving will be referred to as the driving under PWM control or PWM-driving or the like). More specifically, the invention is concerned with a motor driving apparatus which is capable of continuing or stopping selectively and effectively operation of an electric motor employed as a drive source in dependence on abnormal conditions prevailing upon occurrence of a short-circuit fault in a transistor circuit. The invention can profitably find application to a motor-driven power steering system of a motor vehicle, being understood, however, that the invention is never restricted thereto.

2. Description of Related Art

Figure 4:
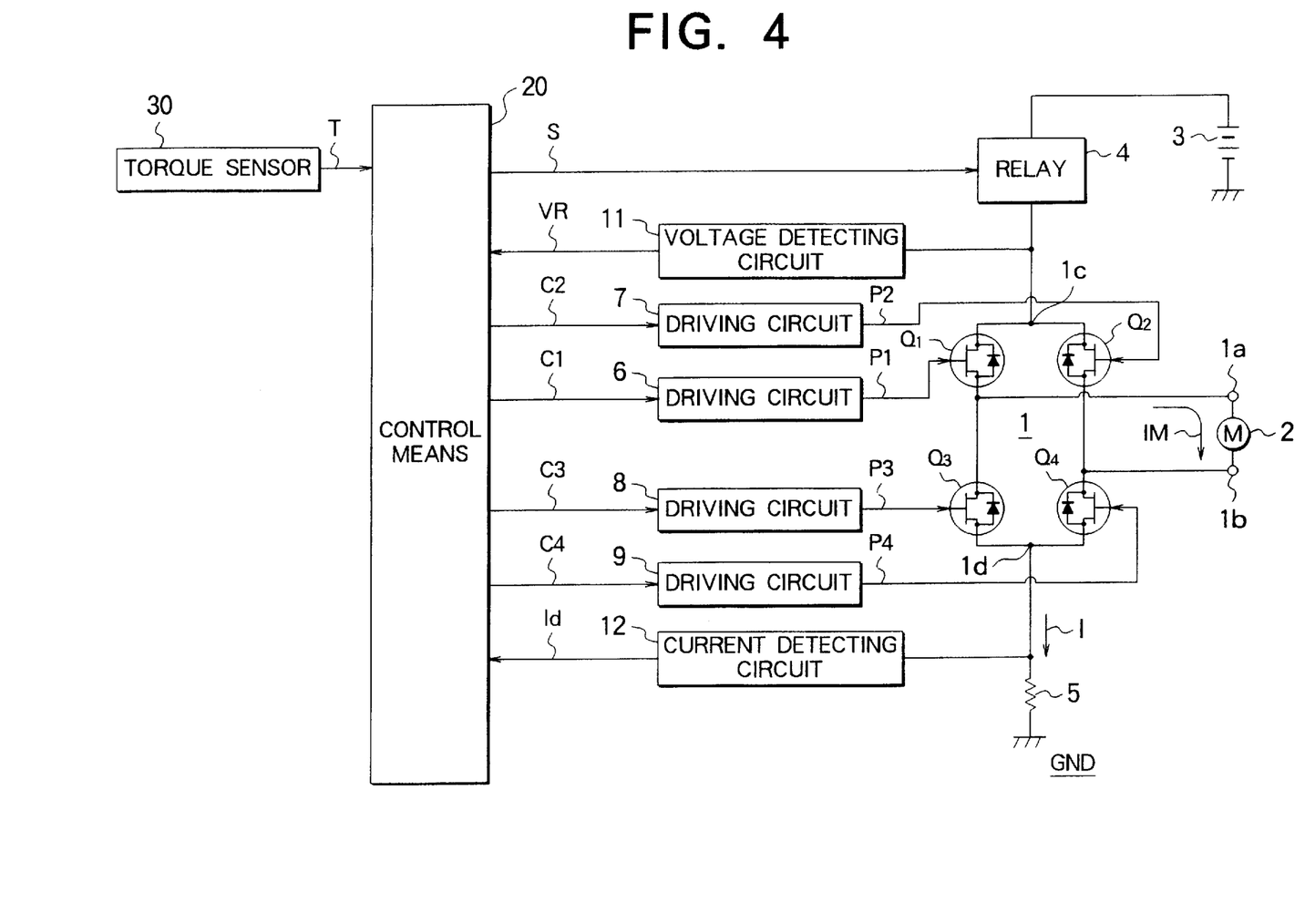
FIG. 4 is a block diagram showing a configuration of a conventional motor driving apparatus known heretofore.

For having better understanding of the invention, description will first be directed to the technical background thereof. FIG. 4 is a block diagram showing generally a circuit configuration of a conventional motor driving apparatus known heretofore. In this case, it is assumed that the motor driving apparatus is adapted for driving an electric motor employed for generating an assist torque in a motor-driven power steering system of an automobile or motor vehicle for assisting a driver in manipulating a steering wheel. A typical example of such motor driving apparatus is disclosed, for example, in Japanese Unexamined Patent Application Publication No. 158455/1990 (JP-A-2-158455).

Referring to FIG. 4, an electric motor 2 whose operation is to be controlled is connected between output terminals 1a and 1b of an H-bridge circuit 1 which in turn is constituted by a plurality of transistors such as FETs (field-effect transistor). In the illustrated circuit, there are employed four transistors or FETs Q1 to Q4, wherein a diode is connected in parallel to each of the transistors Q1 to Q4 in order to allow a motor current IM generated upon stopping of the electric motor 2 to flow through the diodes.

The H-bridge circuit 1 has one end 1c connected to a power supply source 3 which may be constituted, for example, by an onboard battery of a motor vehicle, wherein a relay 4 is inserted between the one end 1c of the H-bridge circuit 1 and the power supply source 3 for the purpose of controlling (i.e., enabling or disabling) the power supply to the electric motor 2. Further, the H-bridge circuit 1 has the other end 1d connected to the ground potential GND, wherein a shunt resistor 5 is inserted between the other end 1d and the ground GND for detecting an electric current I flowing to or through the H-bridge circuit 1.

There are provided a plurality of driving circuits 6 to 9 in correspondence to the transistors (FETs) Q1 to Q4, respectively, wherein PWM signals (or on-signals, i.e., signal for operating the transistor in the constantly or continuously conducting state which may also be referred to as the on state) P1 to P4 are selectively applied to the individual transistors Q1 to Q4.

A voltage detecting circuit 11 is provided for detecting a relay contact voltage VR applied to the one end 1c of the H-bridge circuit 1, while a current detecting circuit 12 is provided for detecting a current value Id on the basis of a voltage appearing at one end of the shunt resistor 5. Further, a torque sensor 30 is provided for detecting a steering torque

2

T applied to a steering system by a driver through a steering wheel in the assumed case where the electric motor 2 is employed for generating an steering assist torque, as mentioned previously.

A control means 20 implemented by using a microcomputer fetches the detected current value Id, the relay contact voltage VR and the output of the torque sensor 30 indicative of the applied steering torque T to thereby output a stop signal S for on/off control of the relay 4 as well as drive control command signals C1 to C4 for controlling the driving circuits 6 to 9, respectively.

Next, referring to FIG. 4, description will be made of operation of the conventional motor driving apparatus on the assumption that the motor driving apparatus is applied to a motor-driven power steering system of a motor vehicle for generating an assist torque for assisting a driver in manipulation of a steering wheel.

For generating a desired assist torque in dependence on the applied steering torque T as detected, the control means 20 first determines selectively the transistors (e.g. transistors Q1 and Q4) to be driven under the PWM control on one hand and to be driven in the on-state on the other hand and at the same time determines a desired duty ratio value of a PWM signal (P1) for the transistor selected for the PWM-driving (e.g. Q1).

More specifically, one (e.g. transistor Q2) of the transistors Q1 and Q2 connected to the power supply source 3 and one (e.g. transistor Q3) of the transistors Q3 and Q4 connected to the ground GND are turned off. In this state, the other one (e.g. transistor Q1) of the transistors Q1 and Q2 connected to the power supply source 3 is driven under the PWM control with the other one (e.g. transistor Q4) of the transistors Q3 and Q4 connected to the ground GND is driven continuously in the on-state.

Thus, the electric motor 2 connected between the output terminals 1a and 1b of the H-bridge circuit 1 is driven for an angular distance in a direction under supply of a motor current IM as commanded by the control means 20.

In that case, in order to enhance the controllability of the duty ratio of each of transistors Q1 to Q4 while suppressing generation of heat and noise upon turning on/off of the transistors, only the transistor Q1 connected to the power supply source 3 is driven under the PWM control with the transistor Q4 connected to the ground GND being maintained steadily in the conducting state (i.e., on state).

Parenthetically, when the electric motor 2 is to be driven in the reverse direction, then the operating states of the transistors are so reversed that the transistors Q2 and Q3 are driven with only the transistor Q2 being driven under the PWM control while the transistors Q1 and Q4 are both turned off.

At this juncture, it is noted that when a short-circuit fault occurs in any one of the transistors Q1 and Q4 or Q2 and Q3 during operation of the electric motor 2, the electric current I flowing through the H-bridge circuit 1 or the motor current IM becomes excessively large. To say in another way, an overcurrent flows through the H-bridge circuit 1 and hence through the electric motor 2.

Such overcurrent is then detected by the current detecting circuit 12, and the detected current value Id indicating the overcurrent is supplied to the control means 20 from the current detecting circuit 12. In response, the control means 20 generates immediately a stop signal S for interrupting application of the PWM signal to the H-bridge circuit 1 to thereby stop operation of the electric motor 2 in order to protect the H-bridge circuit 1, the electric motor 2, the power supply source 3, the relay 4, a fuse (not shown) and so forth from injury or damage due to the overcurrent.

However, when the motor driving apparatus is employed in association with the motor-driven power steering system of a motor vehicle with the electric motor 2 generating an assist torque for the motor-driven power steering system, the stop processing executed by the control means 20 as mentioned above means that the assist torque applied to the steering wheel of the motor vehicle is abruptly reduced to zero during operation of the motor vehicle, which will give rise to not a little shock and uneasiness to the driver or operator. For this reason, the processing for generating the stop signal S immediately in response to occurrence of the short-circuit fault is not preferred.

As is apparent from the above description, the motor driving apparatus known heretofore suffers a problem that because the electric motor 2 is stopped abruptly by interrupting immediately the power supply to the electric motor 2 when the detected current value Id indicates abnormality during operation of the electric motor 2, inconveniences such as mentioned above may arise, although it depends on the applications for which the electric motor 2 is employed.

SUMMARY OF THE INVENTION

In the light of the state of the art described above, it is an object of the present invention to provide a motor driving apparatus which makes it possible to continue a controlled or suppressed power supply to an electric motor which is subjected to the control of the motor driving apparatus, even when the detected current value indicates abnormality, to thereby prevent occurrence of shock due to abrupt stoppage of operation of the motor in a system in which the motor is employed.

In view of the above and other objects which will become apparent as the description proceeds, there is provided according to an aspect of the present invention a motor driving apparatus which includes a plurality of transistors connected in the form of an H-bridge circuit, a power supply source connected to one end of the H-bridge circuit, a relay inserted between the one end of the H-bridge circuit and the power supply source, a ground potential connected to the other end of the H-bridge circuit, a plurality of driving circuits for applying a pulse-width modulated signal or a turn-on signal selectively to the individual transistors, and a control means which is in charge of controlling on/off operation of the relay and the driving circuits. The control means turns off one of the transistors inserted at the side of the power supply source and one of the transistors inserted at the side of the ground, while driving the other one of the transistors inserted at the side of the power supply source and the other one of the transistors inserted at the side of the ground under PWM control (pulse-width modulation control) and in a conducting or on state, respectively, for thereby driving an electric motor connected between output terminals of the H-bridge circuit. The motor driving apparatus further includes a current detecting circuit for detecting an electric current flowing to or through the H-bridge circuit and hence through the electric motor. On the other hand, the control means is comprised of an abnormality decision means for determining abnormality of a detected current value outputted from the current detecting circuit. When it is determined by the abnormality decision means that the detected current value indicates abnormality, both of the other ones of the transistors inserted at the sides of the power supply source and the ground, respectively, are driven under the PWM control (pulse-width modulation control).

By virtue of the arrangement stated above, there can be realized a motor driving apparatus which is capable of continuing a power supply in a suppressed state so that no shock can take place even when abnormality is detected on the basis of the current value detected by the current detecting circuit.

In a preferred mode for carrying out the invention, the abnormality decision means may further include an abnormality decision range setting means for setting an abnormality decision range on the basis of a relation between a duty ratio value of the pulse-width modulated signal applied to the transistors driven under the pulse-width modulation control and the current value detected by the current detecting circuit, wherein abnormality of the detected current value is determined when the duty ratio value and the detected current value fall within the abnormality decision range.

With the preferred arrangement mentioned above, it is possible to detect the short-circuit fault of the transistor with high reliability regardless of variation of the duty ratio value of the PWM driving signal and the motor current value detected by the current detecting circuit. Thus, the motor driving apparatus capable of making decision as to occurrence of abnormality with high reliability can be implemented in a simple and inexpensive circuit configuration.

In another preferred mode for carrying out the invention, the control means may further include a stop condition setting means for setting stop condition for deenergizing or turning off the relay, and a stop condition decision means for deciding whether the stop condition is met or not when abnormality of the detected value of the motor current is determined. When the stop condition is met, a stop signal is outputted to the relay to thereby interrupt electric power supply to the H-bridge circuit and hence to the electric motor.

Owing to the arrangement mentioned above, there can be obtained a motor driving apparatus which is capable of stopping the power supply in dependence on the abnormality status determined after the motor driving mode is changed over to the PWM driving mode.

In yet another preferred mode for carrying out the invention, the stop condition decision means may be so implemented as to output the stop signal so long as the detected value of the motor current and the duty ratio value remain within the abnormality decision range, even when both of the other transistors mentioned previously are driven under the pulse-width modulation control upon determination of abnormality of the detected motor current value.

By virtue of the arrangement mentioned above, there can be implemented a motor driving apparatus capable of interrupting immediately the abnormal current which makes appearance upon occurrence of a short-circuit fault in the transistor which is controlled to be in the nonconducting or off state.

In still another preferred mode for carrying out the invention, the stop condition decision means may be so realized as to decrease gradually a motor current supplied to the electric motor so far as the motor current as detected by the current detecting circuit lies outside of the abnormality decision range when both of the other transistors mentioned previously are driven under the pulse-width modulation control upon determination of abnormality based on the detected current value, while outputting the stop signal when the detected motor current value becomes lower than a predetermined current value inclusive thereof.

With the arrangement mentioned above, there can be provided a motor driving apparatus which is capable of maintaining the supply of the motor current while decreasing gradually the power supply to the motor until the motor is stopped completely.

In a further preferred mode for carrying out the invention, the electric motor may be employed as a drive source in a motor-driven power steering system of a motor vehicle for generating an assist steering torque for assisting a driver in his or her manipulation of a steering wheel. In that case, the control means may include a drive control signal generating means for determining a motor current supplied to the electric motor in dependence on a steering torque applied by the driver.

By virtue of the arrangement mentioned above, there can be realized a motor driving apparatus which is capable of controlling the motor current even when a short-circuit fault occurs in the PWM-driven transistor during the assist torque generating operation of the motor-driven power steering system to thereby secure safety by suppressing occurrence of shock which will otherwise be given to the steering system and hence to the driver.

In a yet further preferred mode for carrying out the invention, the electric motor may be employed in a motor-driven power steering system of a motor vehicle, wherein the stop condition can be so determined that safety of a driver of the motor vehicle is ensured even when the motor is stopped.

With the arrangement mentioned above, there is realized a motor driving apparatus which can ensure safety of the steering system as well as that of the driver even when the motor is stopped in the course of operation of the motor-driven power steering system.

In the motor driving apparatus associated with the motor-driven power steering system, the stop condition decision means may preferably be so implemented as to output the stop signal when the steering torque applied by the driver is smaller than a predetermined value.

With the above arrangement, there is implemented a motor driving apparatus which is capable of securing the safety of the driver in the course of operation of the motor-driven power steering system by stopping the power supply to the motor when the steering wheel has attained a neutral position after the control of the motor current which is effected by suppressing a steep change in the steering torque.

In this conjunction, the stop condition decision means may be so implemented as to output the stop signal when the motor current supplied to the electric motor becomes smaller than a predetermined value.

With this arrangement, there can be obtained a motor driving apparatus which can ensure safety during the motor-driven power steering control operation.

Furthermore, in the case in which the motor is employed for generating an assist steering force for a motor-driven power steering system of a motor vehicle, the control means should preferably include a drive control signal generating means for determining the motor current in dependence on a steering torque applied by a driver.

With the arrangement mentioned above, a motor driving apparatus which can ensure safety by obviating shock taking place upon steep change in the steering torque is realized because even when a short-circuit fault occurs in the transistor driven under the PWM control during the assist torque control operation of the motor-driven power steering system, the control of the motor current can be continued while decreasing gradually the motor current substantially to zero, wherein operation of the apparatus is stopped after the necessity for generation of the assist torque has disappeared.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiments thereof by reference to the drawings. In the following description, like reference characters designate like or corresponding parts throughout the several views.

Embodiment 1

A first embodiment of the invention (i.e., exemplary mode for carrying out the invention) will be described by reference to FIG. 1 which is a block diagram showing generally a circuit configuration of a motor driving apparatus according to the first embodiment of the present invention. As can readily be understood from FIG. 1, the motor driving apparatus according to the instant embodiment of the invention differs from the conventional apparatus described hereinbefore by reference to FIG. 4 only in that some of the functions incorporated in the control means 20 are so modified as to implement the teachings of the present invention. Accordingly, like reference characters as those shown in FIG. 4 are used in FIG. 1 for designating the components similar or equivalent to those mentioned previously by reference to FIG. 4 and repeated description thereof will be omitted.

Figure 1:
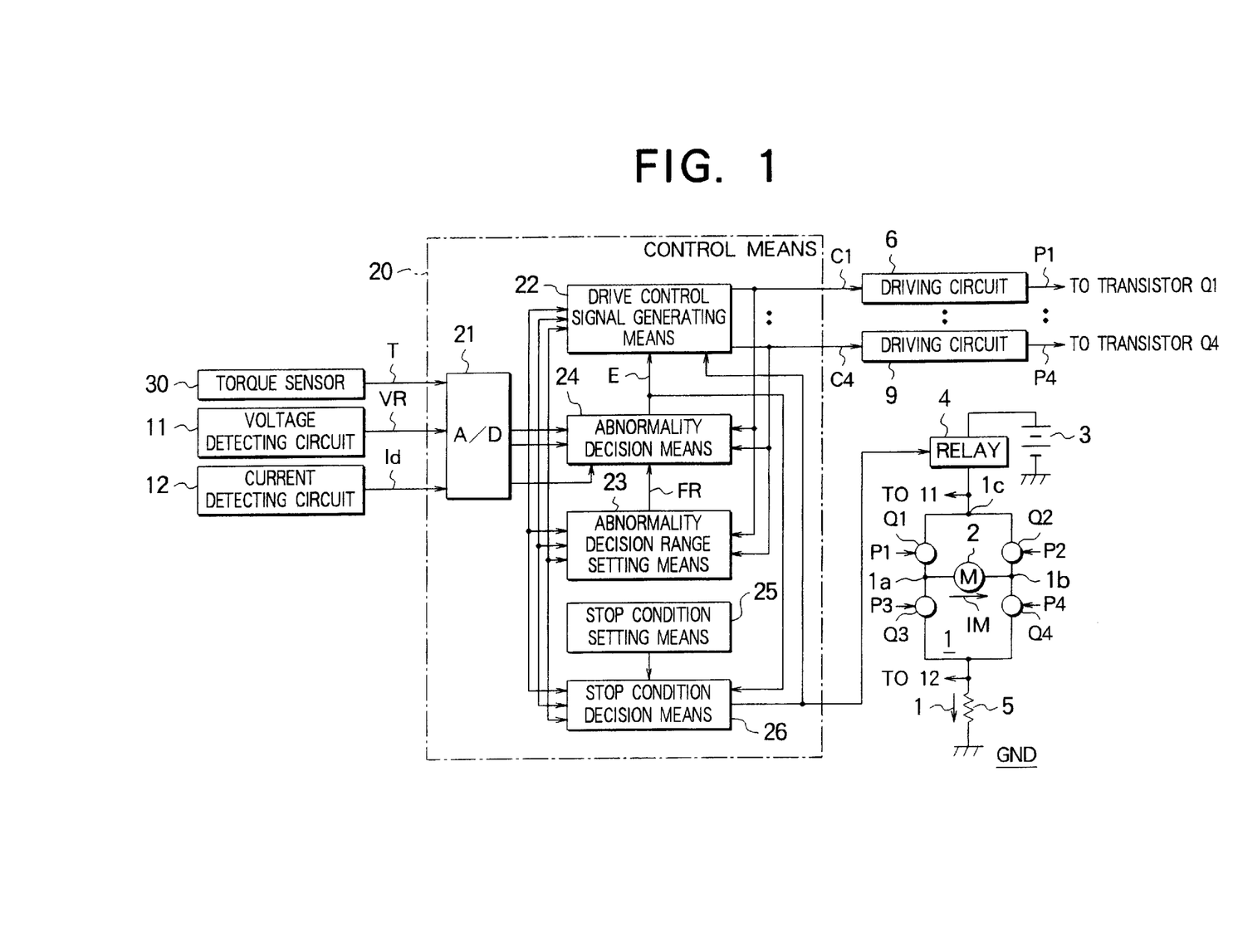
FIG. 1 is a block diagram showing generally a circuit configuration of a motor driving apparatus according to a first embodiment of the present invention.

Now referring to FIG. 1, the control means 20 is provided with an A/D (analogue/digital) converter 21 for converting the detection signals, i.e., the steering torque T, the relay contact voltage VR and the detected current value Id, into corresponding digital signals, respectively, which are suited for processing executed by a microcomputer constituting the control means 20 and a drive control signal generating means 22 which serves to generate drive control signals C1 to C4 for the driving circuits 6 to 9, respectively, on the basis of the steering torque T, the relay contact voltage VR and the detected current value Id which are indicated by the digital signals obtained as the outputs of the A/D converter 21, as mentioned above. So long as the arrangement mentioned above is concerned, the function and configuration of the motor driving apparatus according to the instant embodiment of the invention is substantially same as those of the conventional motor driving apparatus described hereinbefore by reference to FIG. 4.

According to the present invention incarnated in the first embodiment, the control means 20 is further provided with an abnormality decision range setting means 23 for setting an abnormality decision range FR (see FIG. 3) on the basis of a relation between the duty ratio values of the PWM signals for those of the transistors Q1 to Q4 which are operated under the PWM control and the detected current value Id, i.e., the detected value of the current flowing through the H-bridge circuit to the motor 2 and an abnormality decision means 24 for deciding abnormality of the detected current value Id when both the motor-applied voltage and the detected current value Id fall within the abnormality decision range FR, to thereby output an abnormality decision signal E to the drive control signal generating means 22.

On the other hand, the drive control signal generating means 22 is so arranged as to respond to the abnormality decision signal E when the detected current value Id indicates abnormality, to thereby drive both the other resistors (e.g. transistors Q1 and Q4) connected to the power supply source 3 and the ground GND, respectively, (i.e., inserted at the sides of the power supply source 3 and the ground potential GND, respectively, under the PWM control.

Besides, the control means 20 includes a stop condition setting means 25 for setting the stop condition for deenergizing or turning off the relay 4 and a stop condition decision means 26 which responds to the abnormality decision signal E to thereby decide whether the stop condition is satisfied or not, when abnormality of the detected current value Id is determined.

When the stop condition is met, the stop condition decision means 26 outputs the stop signal S to the relay 4 to thereby make the relay 4 stop the power supply to the H-bridge circuit 1.

By way of example, the stop condition decision means 26 may be so arranged that in response to the abnormality decision signal E indicating abnormality of the detected current value Id, the stop condition decision means 26 outputs the stop signal S so long as the abnormality decision range FR is validated even in the state where both the transistors Q1 and Q4 are driven under the PWM control.

Further, the stop condition decision means 26 may be so implemented as to decrease gradually the duty ratio value of the PWM signals P1 and P4 and hence the motor current IM when the abnormality decision range FR is invalidated as a result of driving of both the transistors Q1 and Q4 under the PWM control upon occurrence of abnormality in the detected current value Id and issue the stop signal S only when the detected current value Id is decreased to a predetermined current value (e.g. when the detected current value Id becomes approximately zero).

On the other hand, the stop condition for generating the stop signal S is so established that a system such as a motor-driven power steering system of a motor vehicle which employs the electric motor 2 can be protected against degradation of safety even when the electric motor 2 is stopped. By way of example, assuming that the electric motor 2 of the motor driving apparatus according to the invention is employed in a power steering system of a motor vehicle, the condition for generating the stop signal S may be so established that stoppage of the electric motor 2 does not impair safety of a driver of the motor vehicle even when operation of the electric motor 2 is stopped. In that case, the stop condition decision means 26 may be so arranged as to allow the stop signal S to be outputted when the steering torque T applied by the driver assumes a value smaller than a predetermined magnitude.

Furthermore, the stop condition decision means 26 may be so implemented as to allow the stop signal S to be outputted when the electric motor 2 is not positively driven or when the motor current IM is smaller than a predetermined value.

Figure 2:
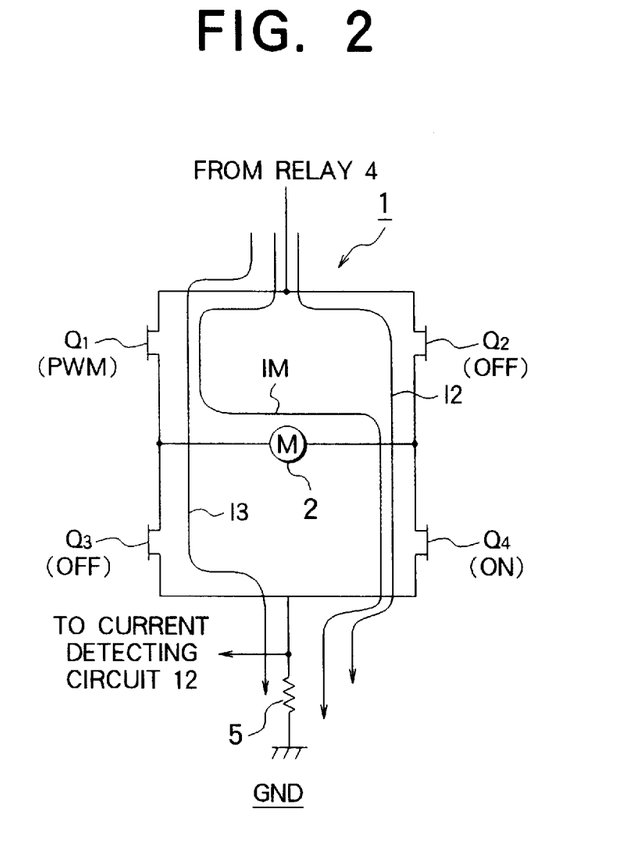
FIG. 2 is a view illustrating operation of motor current detection upon occurrence of abnormality in the motor driving apparatus according to the first embodiment of the invention.
Figure 3:
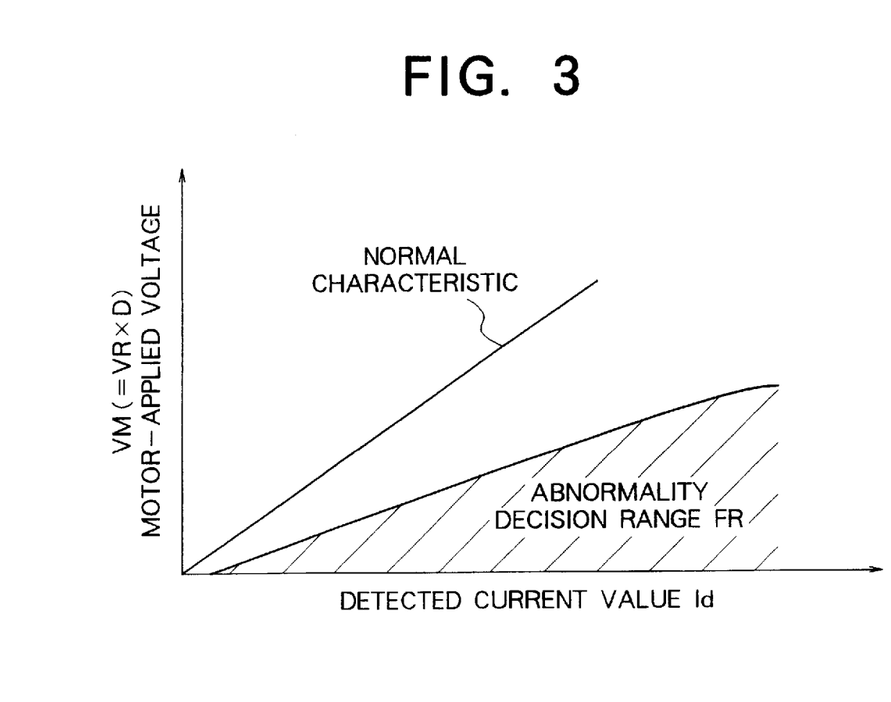
FIG. 3 is a view for illustrating an abnormality decision range employed in the first embodiment of the invention.

Next, referring to FIGS. 2 and 3, description will be directed to operation of the motor driving apparatus according to the first embodiment of the invention shown in FIG. 1.

It is now assumed that the transistors Q2 and Q3 are constantly turned off with the transistor Q4 being constantly turned on whereas the transistor Q1 is driven under the PWM control (i.e., driven by using a pulse width modulated signal whose duty ratio can be controlled), to thereby control the motor current IM, as illustrated in FIG. 2.

In the state where the motor current IM is controlled in this manner, it is again assumed that abnormality (1), (2) or (3) mentioned below take place. On the basis of such assumption, description will be made in what manner these abnormalities can be coped with according to the invention incarnated in the first embodiment thereof.

At this juncture, it should be mentioned that the abnormality decision range FR shown in FIG. 3 is set by the abnormality decision range setting means 23. More specifically, the voltage applied to the motor 2, i.e., motor-applied voltage VM (=VR×D) is determined on the basis of the duty ratio value D of the PWM signal P1 and the relay contact voltage VR, whereon the abnormality decision range FR is set on the basis of a relation between the motor-applied voltage VM and the detected current value Id.

(1) Short-Circuit Fault of Transistor Q1

In this case, the transistor Q1 assumes constantly conducting state (i.e., on state) with the PWM signal P1 being rendered invalid or ineffective, which results in increasing of the motor current IM. Consequently, the relation between the motor-applied voltage VM (determined on the basis of the relay contact voltage VR and the duty ratio value D of the PWM signal P1) and the detected current value Id may fall within the abnormality decision range FR.

Consequently, the abnormality decision means 24 decides abnormality of the detected current value Id (and hence the motor driving current) to thereby output an abnormality decision signal E.

In this conjunction, it should be noted that because the abnormality decision is made by checking whether or not the relation mentioned above falls within the abnormality decision range FR, the decision can be conducted with high reliability regardless of variations of the duty ratio value D and/or the detected current value Id.

In response to the abnormality decision signal E, the drive control signal generating means 22 outputs to the driving circuit 9 the drive control signal C4 for applying the PWM signal P4 to the transistor Q4 to thereby drive both the transistors Q1 to Q4 concurrently under the PWM control.

In that case, it will however be appreciated that the transistor Q1 continues to remain in the conducting or on state because of the short-circuit fault.

The state mentioned above is substantially equivalent to the state in which the transistor Q1 is continuously turned on with the transistor Q4 being driven under the PWM control.

As a result of this, the detected current value Id tends to assume a value close to that of the normal characteristic (see FIG. 3), which in turn means that operation of the motor driving apparatus can be continued for the time being. Besides, because of restoration to the state approximating the normal one, it can be identified or decided that the abnormality now of concern is ascribable to the short-circuit fault of the transistor Q1.

Subsequently, the duty ratio value D is progressively diminished to thereby reduce gradually the motor current IM. At the time point when the detected current value Id of the motor current IM becomes substantially equal to zero, the stop signal S is outputted to thereby stop or interrupt the power supply to the H-bridge circuit 1 and hence to the electric motor 2.

Thus, when a short-circuit fault occurs in the transistor Q1, operation of the electric motor 2 can be stopped smoothly while ensuring safety for a system associated with the motor 2.

Thereafter, the H-bridge circuit 1 is repaired by exchanging the transistor Q1 with a sound one to restore the normal state of the H-bridge circuit 1, whereupon the drive control for the H-bridge circuit 1 can be performed in the ordinary manner.

(2) Short-Circuit Fault of Transistor Q2

Because the short-circuit fault occurs in the transistor Q2 connected in series to the transistor Q4 which is held constantly in the conducting or on state, the motor current IM flowing to the electric motor 2 is interrupted, whereas a large current I2 flows to the ground GND from the power supply source 3, as can be seen in FIG. 2.

As a consequence, the detected current value Id increases within the abnormality decision range FR as shown in FIG. 3, substantially in the manner described previously, whereupon both the transistors Q1 and Q4 are concurrently driven under the PWM control.

In that case, the duty ratio value of the PWM signals P1 and P4 applied concurrently to the transistors Q1 and Q4, respectively, are significantly decreased through feedback control performed by the control means 20 on the basis of the detected current value Id, the current I flowing to the H-bridge circuit 1 can be effectively suppressed.

In this conjunction, it should however be noted that because no large current I2 can flow through the electric motor 2, the detected current value Id continues to remain within the abnormality decision range FR. Furthermore, on the basis of the status mentioned above, it can be discriminatively identified that the short-circuit fault now of concern does not take place in the transistor Q1.

(3) Short-Circuit Fault of Transistor Q3

Because the motor current IM can scarcely flow through the electric motor 2 when the short-circuit fault occurs in the transistor Q3 connected in series to the transistor Q1 driven under the PWM control, a large current I3 flows from the power supply source 3 to the ground GND, as can be seen in FIG. 2.

Consequently, the detected current value Id increases up to a level which falls within the abnormality decision range FR, as in the case of the short-circuit fault of the transistor Q2, whereby the transistors Q1 and Q4 are simultaneously put into PWM operation.

In this case, the PWM duty ratio value for the transistors Q1 and Q4 are reduced under the effect of the feedback control of the detected current value Id through the control means 20, involving effective reduction of the detected current value Id.

In this case, because the large current I3 can not flow through the electric motor 2, as in the case of the short-circuit fault of the transistor Q2, the detected current value Id is prevented from going out of the abnormality decision range FR. Thus, it can be identified that the abnormal state now of concern is not due to the short-circuit fault of the transistor Q1.

More specifically, in the case of the short-circuit fault of the transistor Q1 mentioned above, the detected current value Id assumes a value corresponding to the motor current IM. Thus, the motor current IM can be controlled. However, in the case of the short-circuit fault of the transistors Q1 or Q3, the detected current value Id does not represents the motor current IM, rendering it impossible to control the motor current IM.

Thus, when the detected current value Id does not go out of the abnormality decision range FR notwithstanding of the PWM-driving of the transistor Q1 and Q4 upon decision of abnormality, as in the case of the short-circuit faults (2) and (3) mentioned above, continuation of the power supply to the H-bridge circuit 1 is of no use. Accordingly, the stop condition decision means 26 outputs immediately the stop signal S with preference being put on the protection of the power supply source 3, to thereby deenergize the relay 4 for interrupting the power supply to the H-bridge circuit 1.

In other words, only when the abnormality which permits the control of the motor current IM takes place, as in the case of the short-circuit fault (1) mentioned previously, the control of the electric motor 2 is continued to reduce gradually the power supply to a level at which the motor operation can be smoothly stopped, from the standpoint of safety. On the other hand, when such abnormality takes place which makes it impossible to control the motor current IM, as in the case of the short-circuit faults (2) and (3) mentioned previously, the power supply is instantaneously interrupted in order to protect the power supply source 3, the relay 4, a fuse (not shown) and others by obviating load imposed to these elements.

Embodiment 2

In the case of the first embodiment of the motor driving apparatus according to the invention, it has been assumed that the electric motor constituting a part of the motor driving apparatus is to serve for producing an assist torque for the motor-driven power steering system. It should be however appreciated that the electric motor of concern may be one employed in other applications.

In that case, other types of sensors may be used in place of the torque sensor 30 employed for detecting the steering torque T in dependence on various applications.

Embodiment 3

Furthermore, in the case of the motor driving apparatus according to the first embodiment of the invention described hereinbefore, the duty ratio value of the PWM signal for controlling the H-bridge circuit 1 is decreased progressively to thereby reduce gradually the motor current IM with the electric motor 2 being stopped after suppression of shock otherwise given to the load, with a view to ensuring the safety for the motor-driven power steering system as well as operator thereof, when it is possible to control the motor current IM with the PWM driving operation effectuated in response to abnormality decision, while when it is impossible to control the motor current IM, the stop signal S is outputted instantaneously. In this conjunction, the stop condition for allowing the stop signal to be generated instantaneously may be altered so long as the safety of a driver of a motor vehicle equipped with a power steering system including a motor controlled according to the teachings of the invention can be ensured even when the electric motor 2 is stopped instantaneously.

By way of example, the stop condition decision means 26 may be so implemented that the stop signal S is outputted immediately after the decision of abnormality to thereby interrupt the power supply to the electric motor 2 when the steering torque T applied by the driver is smaller than a predetermined value, i.e., when the steering wheel is in a neutral state where substantially no steering operation is performed.

Furthermore, the stop condition decision means 26 may also be so implemented that when the motor vehicle is running at a high speed with the electric motor 2 being placed in the non-operating state or when the motor current IM is smaller than a predetermined value, indicating that the motor assumes a state approximating the non-operating state, the stop signal may be outputted immediately upon decision of abnormality.

Embodiment 4

In the case of the motor driving apparatus according to the first embodiment of the invention, the abnormality decision range FR is set by taking into consideration the voltage applied to the H-bridge circuit 1, i.e., the relay contact voltage VR. However, to this end, the output voltage of the power supply source 3 may equally be made use so far as the voltage drop appearing across the relay 4. Further, the voltage applied to the H-bridge circuit 1 can be neglected when the power source voltage can be considered to be constant.

In this way, the abnormality decision range FR can be established on the basis of a relation between the duty ratio value D of the PWM signal and the detected current value Id.

Many modifications and variations of the present invention are possible in the light of the above techniques. It is therefore to be understood that within the scope of the appended claims, the invention may be practiced otherwise than as specifically described.

What is claimed is:

1. An apparatus for driving an electric motor, comprising:
   a plurality of transistors constituting an H-bridge circuit, said H-bridge circuit comprising a first plurality of transistors at a first end side and a second plurality of transistors at a second end side thereof, wherein output terminals are defined between said first plurality and second plurality of transistors;
   a power supply source connected to said first end of said H-bridge circuit;
   a relay inserted between said first end of said H-bridge circuit and said power supply source;
   a ground connected to said second end of said H-bridge circuit;
   a plurality of driving circuits for applying either one of a pulse-width modulated signal or a turn-on signal selectively to each of said transistors;
   control means for controlling on/off operation of said relay and each of said driving circuits;
   wherein said control means is operative in a first operating mode to turn off one of said first plurality of transistors at the first end side connected to said power supply source and one of said second plurality of transistors at the second end side connected to said ground and to drive other of said first plurality of transistors at the first end side connected to said power supply source and other of said second plurality of transistors at the second end side connected to said ground under pulse-width modulation control or in an on state;
   for thereby driving an electric motor connected between said output terminals of said H-bridge circuit;
   said motor driving apparatus further comprising:
      a current detecting circuit for detecting an electric current flowing to said H-bridge circuit;
      wherein said control means comprises abnormality decision means for determining an abnormality of a detected current value outputted from said current detecting circuit; and
      wherein, when said abnormality decision means determines the existence of an abnormality on the basis of said detected current value, said control means is operative in a second operating mode to concurrently drive both said other of said first plurality of transistors and said other of said second plurality of transistors under the pulse-width modulation control, while maintaining off said one of said first plurality of transistors and said one of said second plurality of transistors.

2. A motor driving apparatus according to claim 1,
   said electric motor being a motor which generates an assist steering torque for a motor-driven power steering system of a motor vehicle;
   wherein said control means includes a drive control signal generating means for determining a motor current supplied to said electric motor in dependence on a steering torque applied by a driver of said motor vehicle.

3. A motor driving apparatus according to claim 1,
   said abnormality decision means further comprising:
      abnormality decision range setting means for setting an abnormality decision range on the basis of a relation between a duty ratio value of the pulse-width modulated signal applied to the transistors driven under the pulse-width modulated control and said detected current value;
      wherein abnormality of said detected current value is determined when said relation between a duty ratio value and said detected current value falls within said abnormality decision range.

4. A motor driving apparatus according to claim 1,
   said control means further comprising:
      stop condition setting means for setting stop condition for turning off said relay; and
      stop condition decision means for deciding whether said stop condition is met or not when abnormality of said detected current value is determined;
      wherein when said stop condition is met, a stop signal is outputted to said relay to thereby stop electric power supply to said H-bridge circuit.

5. A motor driving apparatus according to claim 3, wherein said stop condition decision means outputs said stop signal so long as no departure from an abnormality decision range is detected, even when more than one of said plurality of transistors are driven under the pulse-width modulation control upon determination of abnormality of said detected current value.

6. A motor driving apparatus according to claim 3, wherein said stop condition decision means decreases gradually a motor current supplied to said electric motor so long as departure from an abnormality decision range is detected when more than one of said plurality of transistors are driven under the pulse-width modulation control upon determination of abnormality of said detected current value, while outputting said stop signal when said detected current value becomes lower than a predetermine current inclusive thereof.

7. A motor driving apparatus according to claim 4, said electric motor being a motor which generates an assist steering torque for a motor-driven power steering system of a motor vehicle.

8. A motor driving apparatus according to claim 7, wherein said stop condition decision means outputs said stop signal unless a steering torque applied by said driver is greater than a predetermined value.

9. A motor driving apparatus according to claim 7, wherein said stop condition decision means outputs said stop signal unless the motor current supplied to said electric motor is greater than a predetermined value.

10. A motor driving apparatus according to claim 5, said electric motor being a motor which generates an assist steering torque for a motor-driven power steering system of a motor vehicle;

wherein said control means includes drive control signal generating means for determining a value of said motor current in response to a value of a steering torque applied by a driver of said motor vehicle.

\* \* \* \* \*